United States Patent [19]

Foyn

[11] 4,396,509
[45] Aug. 2, 1983

[54] DEVICE FOR EXTRACTION OF LIQUID FROM SUSPENSIONS IN MOVEMENT

[75] Inventor: Tore Foyn, Karlstad, Sweden

[73] Assignee: Kamyr AB, Karlstad, Sweden

[21] Appl. No.: 221,810

[22] Filed: Dec. 31, 1980

[30] Foreign Application Priority Data

Jan. 10, 1980 [SE] Sweden .............................. 8000197

[51] Int. Cl.³ .............................................. B01D 33/00
[52] U.S. Cl. ................................ 210/315; 210/333.01
[58] Field of Search .................. 210/333.01, 411, 315, 210/357, 448, 452; 162/60, 251; 68/181

[56] References Cited

U.S. PATENT DOCUMENTS 3,347,386 10/1967 Kraissl, Jr. ..................... 210/452 X
3,530,993 9/1970 Fulton ................................ 210/411
4,041,560 8/1977 Jacobsen .

*Primary Examiner*—Frank A. Spear, Jr.
*Attorney, Agent, or Firm*—Cushman, Darby & Cushman

[57] ABSTRACT

A screen assembly is provided for the dewatering of flowing suspensions. A screen body having a perforated wall has a first slide bearing mounted at a first end thereof, and a second slide bearing mounted to a second end thereof. The screen body is mounted in a generally cylindrical container through which suspension to be dewatered flows in a first direction, and the screen slide bearings engage first and second bearing surfaces mounted interiorly of the container. The bearing surfaces have different effective cross-sectional areas. The screen between the first and second ends thereof and the bearing surfaces define a screen cavity volume, and a rod attached to a linear actuator moves the screen in the first direction, and in a second direction opposite the first direction, so that the cavity volume changes during movement of the screen. The screen and bearings may have any desired configuration or cross-sectional area.

17 Claims, 7 Drawing Figures

DEVICE FOR EXTRACTION OF LIQUID FROM SUSPENSIONS IN MOVEMENT

BACKGROUND AND SUMMARY OF THE INVENTION

The invention relates to an apparatus for continuously removing liquid (dewatering) from flowing suspensions, and a screen assembly utilizable in such apparatus. The invention is of the same general type of dewatering apparatus as shown in U.S. Pat. No. 4,041,560 (the disclosure of which is hereby incorporated by reference herein), wherein a screen body is reciprocated in a direction generally parallel to a suspension flow, with backflushing of the screen openings taking place during movement of the screen opposite to the direction of movement of the suspension.

While prior systems such as disclosed in U.S. Pat. No. 4,041,560 are generally successful in accomplishing their desired results, there are several areas where improvement is possible. The apparatus according to the present invention is advantageous compared to such prior art assemblies in a number of ways. In particular, the apparatus according to the invention has a greater effective screening area for a given design length, can be made much bigger since even when large it will not significantly interfere with the flow pattern of the suspension, and consumes less power since the moveable parts can be of smaller weight and there is less resistance to movement.

According to one aspect of the present invention a screen assembly is provided for an apparatus for continuously dewatering flowing suspensions. The screen assembly includes a screen body having a perforated wall for allowing the passage of liquids therethrough but preventing the passage of particles greater than a predetermined size therethrough. The screen body is elongated in the first direction and has first and second ends, with a first slide bearing mounted to the screen body first end and a second slide bearing mounted to the screen body second end. The second slide bearing is spaced from the screen body perforated wall a distance greater than the distance the first slide bearing is spaced from the screen body perforated wall, and means are attached to the screen body for facilitating attachment of a device for moving the screen body generally in the direction of elongation of the screen body. The screen body perforated wall may define a cylinder side wall, the cylinder being circular in cross-section with the bearings being annular components, and the means facilitating attachment may comprise a connecting sprider mounted to the interior of the perforated cylinder wall.

According to another aspect of the present invention as apparatus is provided for continuously dewatering flowing suspensions, which apparatus includes a generally cylindrical container through which suspension to be dewatered flows in a first direction, the container having an axis extending generally parallel to or concentric with the first direction. Screen means are provided for removal of a portion of liquid from the suspension flowing through the container, and extending generally along the axis of the container in which it is disposed, the screen means comprising a first end and a second end opposite the first end and spaced generally along the axis from the first end. Sealing bearing means are mounted on the first end and the second end of the screen means, respectively, for movement with the screen means and cooperate with first and second bearing surface means, respectively, mounted interiorly of the container. The bearing surface means have different effective cross-sectional areas. The screen means between the first and second ends thereof and the bearing surface means defined a screen cavity volume, and an outlet is provided extending from the screen cavity volume to an area remote from the container. Mechanical means for moving the screen means in the first direction and in a second direction opposite the first direction are provided, so that the cavity volume changes during movement of the screen means to effect backflushing during movement in the second direction.

The screen means and bearing surface means may have a wide variety of shapes and configurations. For instance the screen means may be planar and the bearing means linear and the bearing surface means planar, or the screen means may be cylindrical with the bearing means and bearing surface means annular. Similarly the cylindrical container may have any desired cross-section, including circular and quadrate. Normally the mechanical means moves the screen in the first direction at about the speed at which the suspension flows, and moves the screen in the second direction at a much greater speed.

The apparatus according to the present invention may be used for dewatering a wide variety of suspensions, but is particularly useful for dewatering comminuted cellulosic fiber material suspended in a liquid, which can be either water or a chemical treatment liquid, such suspensions commonly being used and produced during the production of paper products.

It is the primary object of the present invention to provide an approved apparatus, and components therefor, for continuously dewatering flowing suspensions. This and other objects of the invention will become clear from an inspection of the detailed description of the invention, and from the appended claims.

DETAILED DESCRIPTION OF DRAWINGS

Figure 1:
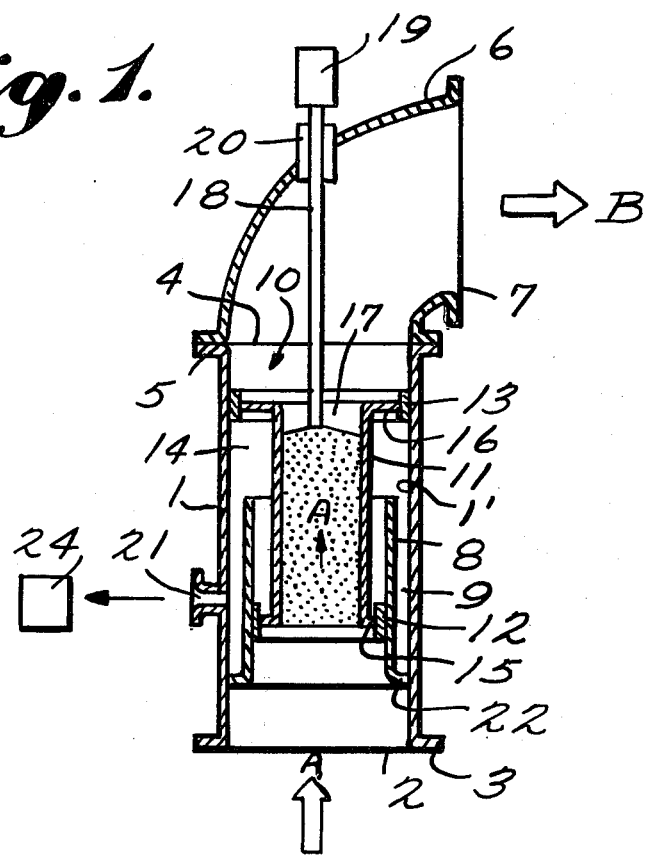
FIG. 1 is a lengthwise cross-sectional view of an exemplary apparatus according to the present invention with a central throughflow of suspension.

In the exemplary embodiment of the invention illustrated in FIG. 1, the apparatus for dewatering a suspension, such as a comminuted cellulosic fiber suspension, includes a generally cylindrical container 1 through which the suspension to be dewatered flows in a first direction indicated by arrows A. The container 1 has an axis extending generally parallel to or concentric with the first direction A. Any suitable components may be provided for connecting the container 1 to appropriate structures for providing a flow of suspension into and out of it, such as the open lower end 2 equipped with a flange 3 for connection to a pipeline or another container 1, and an open top end 4 equipped with a flange 5. A bent pipe section 6 with outlets 7 may be connected to open top 4 as indicated, the eventual path of flow of the suspension after being dewatered being in the direction of arrow B. The container 1 may have any suitable cross-section, being illustrated in FIG. 1, and FIGS. 2 and 3, as having a circular cross-section, although it also may be quadrate, or another suitable shape.

The apparatus illustrated in FIG. 1 further comprises screen means for removal of a portion of the liquid from the suspension flowing through the container 1, and extending generally along the axis of the container. In the FIG. 1 embodiment the screen means is illustrated as a screen body 10 having a perforated wall 11, the wall in this embodiment defining a cylinder side wall, the cylinder being circular in cross-section. The screen body includes a first end 16 and second end 15, spaced generally along the axis (in direction A) from the first end. Sealing bearing means are mounted to the ends of the screen body 10 for cooperation with bearing surface means to allow movement of the body 10 with respect to the container 1. The sealing bearing means include first sealing bearing means 13 mounted to first end 16 of screen 10, and second sealing bearing means 12 mounted to second end 15 of screen body 10. In the embodiment illustrated in FIG. 1 the first slide bearing 13 is spaced from the perforated wall 11 a distance greater than the distance the second slide bearing 12 is spaced from the wall 11, and in the illustrated embodiment the slide bearings 12, 13 are annular. Under some circumstances the annular slide bearings 12, 13 need not be continuous, but may be segmented.

The bearing surface means for cooperating with the sealing bearing means 12, 13 for providing backflushing of the screen perforated wall comprise first and second bearing surface means mounted interiorly of the container 1 for cooperating with the sealing bearing means 12, 13, respectively. In FIG. 1 the first bearing surface mean comprises the interior surface 1' of the container 1, and a tubular sleeve 8 concentric with the container interior surface 1'. As clearly illustrated in FIG. 1, the effective cross-sectional area of the container interior surface 1' is different (greater) than the effective cross-sectional area of the sleeve 8. By effective cross-sectional area is meant the area circumscribed by the surfaces defining the extent of the bearing surface means which cooperate with the slide bearings 12, 13. For the embodiment illustrated in FIG. 1, the first bearing means cross-sectional area would be the interior circular cross-sectional area of the container 1, while the second bearing means cross-sectional area would be the interior circular cross-sectional area of the tubular sleeve 8. The tubular sleeve 8 is connected to the container 1 in any appropriate manner, such as utilizing the solid ring 22 integral with the sleeve 8 and welded to the interior surface 1' of container 1.

The screen means 10 between the first and second ends 16, 15 thereof and the bearing surface means 1', 8 define a screen cavity volume. The screen cavity volume includes the annular volume 9 between the container interior surface 1' and the tubular sleeve 8, and the annular volume 14 between the screen wall 11 and tubular sleeve 8. An outlet 21 extends from the screen cavity volume 9, 14 to an area remote from the container 1, such as to any suitable storage or recycling means such as reservoir 24. The outlet 21 in the FIG. 1 embodiment directly communicates with the volume between the interior container 1' and the tubular sleeve 8.

While the exemplary embodiments of the invention illustrated in the drawings, and described above, include the sealing bearing means 12, 13 on the screen 11, and include the bearing surface means on interior structures within the container (such as the interior surface of container 1 and the tubular sleeve 8), the opposite may be true. That is, the sealing bearing means may be mounted on stationary components, and the bearing surface means may be located on the moving screen means. The same relative sliding action and cavity volume-change results are achieved in each instance. Interior first and second support members mount the screen 11 for reciprocation with respect thereto, for instance such support members comprising the interior of container 1 and the tube 8 in FIG. 1, and either the sealing bearing means or the bearing surface means may be mounted thereon, continuous and unapertured over the entire length thereof as illustrated in the drawings.

The dewatering apparatus illustrated in FIG. 1 further includes mechanical means for moving the screen means in the first direction A and in a second direction, opposite the first direction A. Because of the particular dimensional relationships and orientation of the slide bearings 12, 13 and bearing surface means 1', 8 screen cavity volume 9, 14 changes during movement of the screen means, this volume change facilitating backflushing of the openings in the perforated screen wall 11 during movement in the second direction. The mechanical means illustrated in FIG. 1 include a spider 17 disposed interiorly of cylindrical screen wall 11 and rigidly attached thereto, and connected to rod 18 which in turn is connected to a linear actuator 19, the rod 18 passing through bearing 20 through the wall of pipe bend 6. The linear actuator 19 may be a hydraulic piston or any other suitable actuator, such as described in U.S. Pat. No. 4,041,560, and preferably is operated to move the screen 10 in direction A at a speed generally comparable to the speed of the suspension flowing in direction A, and to move the screen 10 during backflushing (in the second direction, opposite direction A) at a much greater speed. As the screen 10 moves in the direction A the cavity volume 9, 14 increases, and when it moves in the second direction the cavity volume decreases. Thus a suction is obtained through the screen openings for extraction of liquid during movement in the first direction, and a pressure for back-flushing of liquid to the suspension is provided during movement in the second direction.

Figure 2:
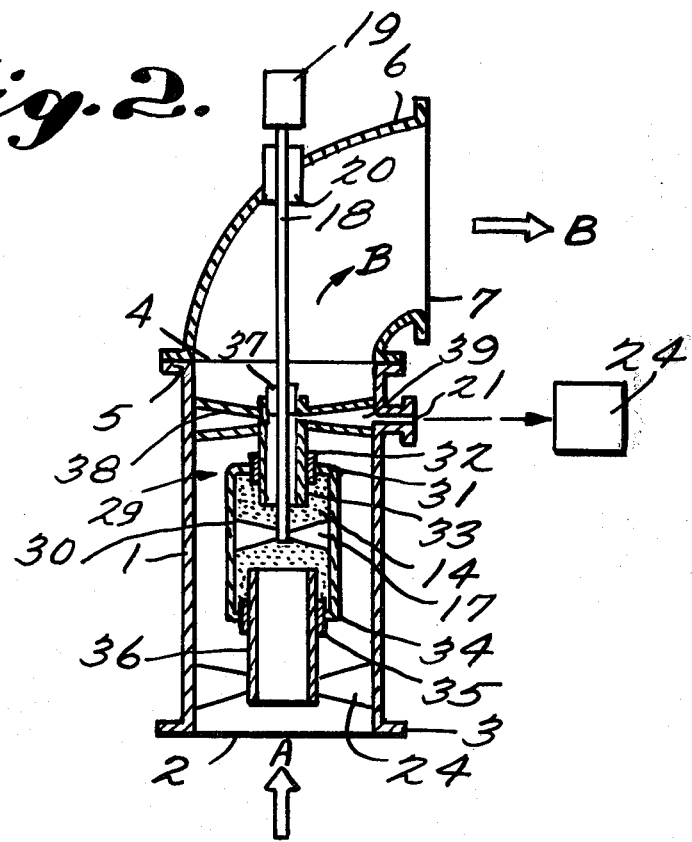
FIG. 2 is a lengthwise cross-sectional view of an another embodiment of an exemplary apparatus according to the present invention, this embodiment having a peripheral throughflow of suspension.
Figure 3:
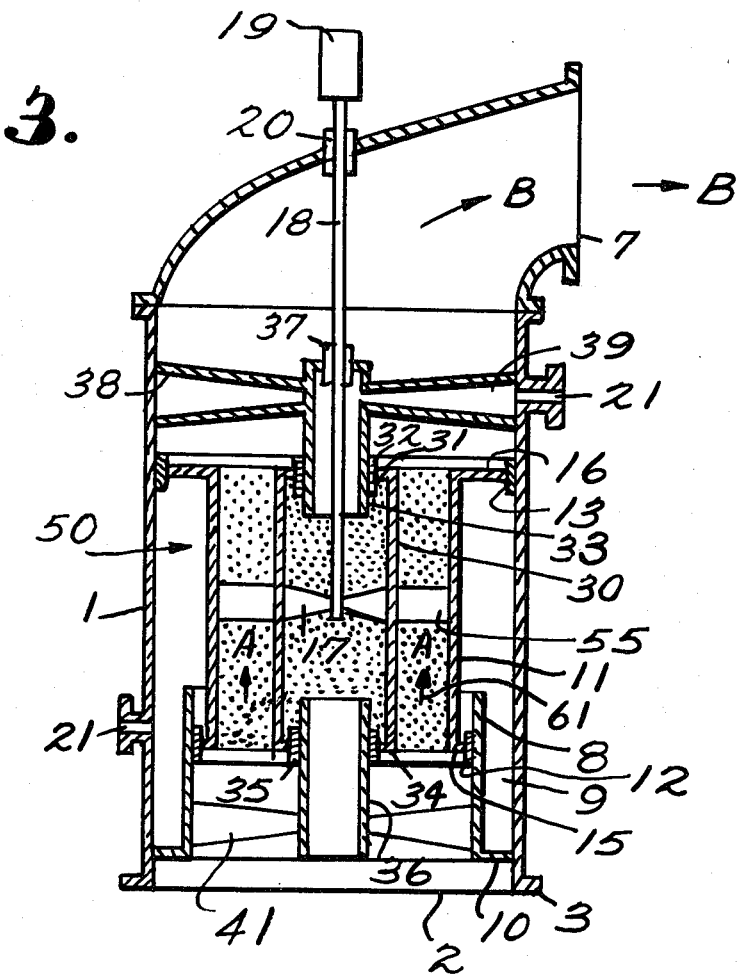
FIG. 3 is a lengthwise cross-sectional view of an exemplary apparatus combining features of the embodiments of FIGS. 1 and 2.

In the embodiments illustrated in FIG. 2 and 3 components corresponding to those in the FIG. 1 embodiment are designated by like reference numerals.

In the FIG. 2 embodiment, the screen means and bearing surface means are quite different than those illustrated in the FIG. 1 embodiment. In particular, while the screen means 29 includes a perforated wall 30 defining a cylinder side wall, the cylinder being circular in cross-section, and the first slide bearing 32 is attached to first end 31 of screen 29 and the second slide bearing 35 is attached to second end 34 of screen 29 also being annular, the diameters of the annular slide bearings 32, 35 are less than the diameter of the screen 30 (in the FIG. 1 embodiment the diameters of the slide bearings are greater than that of the screen body). In this embodiment the first bearing surface means comprises a first, hollow, cylindrical interior member 33, while the second bearing surface means comprises a second cylindrical, hollow, interior member 36 substantially concentric with the first member 33 and spaced therefrom along the first direction A. The first member 33 is preferably connected by spider ribs 38, at least one of which has a cavity 39, to the container 1, the cavity 39 communicating with the hollow interior of member 33 and the outlet 21. The second member 36 is connected by spider ribs 41 to the container 1. The ribs 38, 41 provide minimal interference with the suspension flow.

The embodiment of FIG. 3 is a combination of the FIG. 1 and 2 embodiments. In this case the screen means 50 include both screen walls 11, 30, mounted concentrically. The screens 11, 30 are connected to each other by a plurality of radially extending ribs 55, so that they move together under the influence of linear actuator 19. In this embodiment there is both a central and peripheral throughflow of the suspension, the suspension flow being central with respect to screen 11 and peripheral with respect to screen 30.

Figure 4:
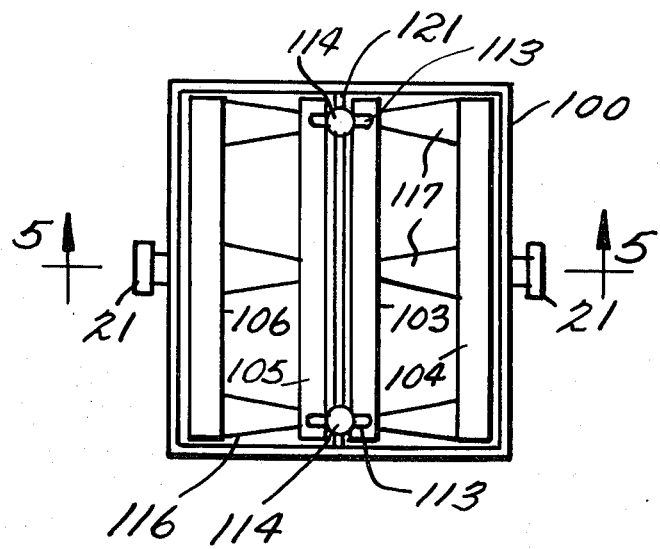
FIG. 4 is a top plan view of another exemplary embodiment of apparatus according to the present invention.
Figure 5:
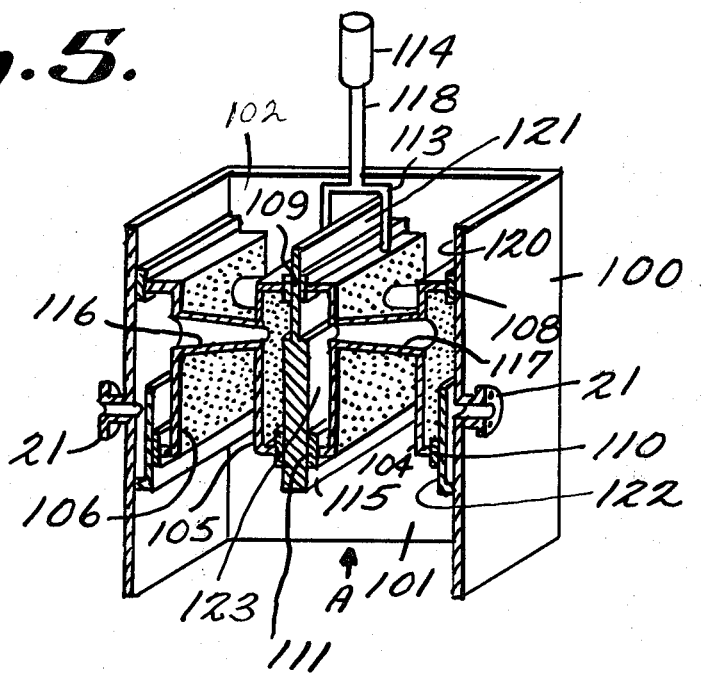
FIG. 5 is a perspective view, partly in cross-section and partly in elevation, of the apparatus of FIG. 4, the section being taken along lines 5—5 of FIG. 4.

The embodiment illustrated in FIGS. 4 and 5 helps illustrate the variety of forms which the container, screen means, sealing bearing means, and bearing surface means may take within the scope of the present invention. In the embodiment illustrated in FIGS. 4 and 5, the container is illustrated at 100, comprising a structure that is quadrate in cross-section, and the screen means may comprise first and second screen bodies 101, 102. The first screen body 101 comprises first and second planar screens 104, 103, respectively, which are connected for common movement by a plurality (at least one) of tubular conduits 117, the conduits 117 preferably having a smaller interior cross-sectional area at the interconnection thereof to the second screen 103 than at the interconnection to the first screen 104, as clearly illustrated in FIG. 5. The sealing bearing means 108 and 109, and 110 and 111, respectively, are linear strips, while the first bearing surface means comprise an interior side wall 120 of container 100 and a first surface 121 of an interior divider in that container 100, while the second bearing means comprise a shelf 122 spaced from and parallel to the interior surface 120 and a second surface 123 of the divider. If desired, instead of merely being spaced planar screens 103, 104 the screen body 101 could comprise a continuous perforated wall defining the side wall of a cylinder which was quadrate in cross-section. In such a case, the slide bearings 108, 109 would be connected along the other walls of the screen body, and would engage other interior side walls of the container 100, and likewise for the slide bearings 110, 111, the shelf 122 also being continued along other interior side walls of container 100.

In the embodiment illustrated in FIGS. 4 and 5 the screen means second body 102 comprises the planar screens 105, 106 connected by a plurality of tubular conduits 116, and having slide bearings and bearing surface means comparable to those associated with first screen body 101 (as most clearly illustrated in FIG. 5). Outlets 21 are provided from each of the screen cavity volumes defined between the various screens and bearing surfaces. Reciprocatory linear movement of the screen bodies 101, 102 preferably is contemporaneous, the tangs of the forks 113 being rigidly connected to the top ends of the screens 103, 105 and being connected by rods 118 to linear actuators 114, the operation of the actuators 114 being synchronized by any suitable conventional means (not shown).

If desired, the interior divider wall 115 providing the bearing surface means 121, 123, etc. may be made hollow so that liquid can flow in direction A therethrough, or it can be made hollow and communicate with the screen cavity volume and in that case be connected up to another outlet for liquid extracted from the flowing suspension, in which case the connectors 116, 117 do not need to be tubular, but rather can be solid.

Figure 6:
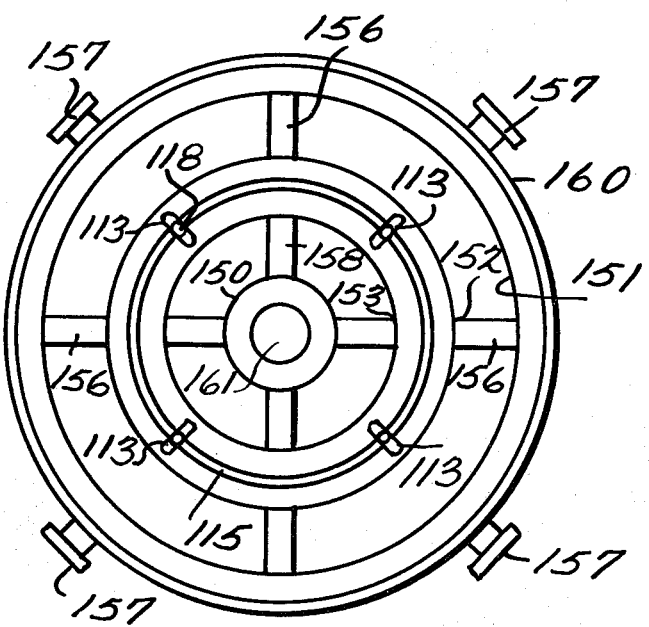
FIG. 6 is a top plan view of another exemplary embodiment of an apparatus according to the present invention.
Figure 7:
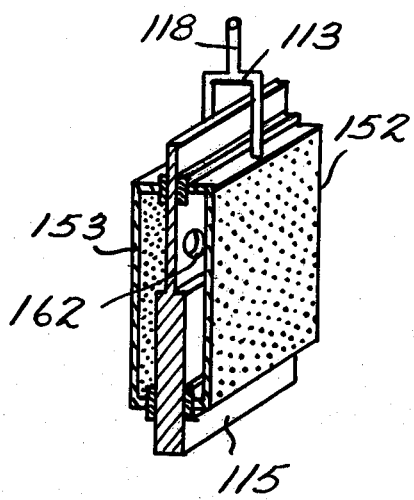
FIG. 7 is a detailed perspective sectional view of a ring-shaped screen element of the FIG. 6 embodiment.

In the embodiment illustrated in FIGS. 6 and 7 of the drawings, the screen means comprise a plurality of concentric annular screen bodies, the bodies collectively having screen surfaces 150, 152, 153, and 151 facing each other and distributed over the cross-section of the container. Typical annular screen surfaces 152, 153 are illustrated in detail in FIG. 7.

Hollow connecting arms 158 provide a physical connection and liquid pathway between the interior screen surface 150 and the screen surface 153, while hollow connecting arms 156 provide a physical and liquid communicating connection between the outer screen wall 151 and the wall 152. The bearing surface means for the outer screen 151 comprises the interior wall of the container 160, while the bearing surface means for the inner screen 150 is provided by the interior post 161. The surface of the interior of the container 160 and the exterior of the post 161 are stepped to provide the necessary difference in effective cross-sectional area. The bearing surface means for the screens 152, 153 is provided by the interior annular divider 115 (see FIG. 7 in particular), which also has a stepped surface as illustrated in FIG. 7.

Openings 162 may be provided along the entire extent of the divider 115 for providing liquid communication between the volumes defined by screens 152 and 153 and the divider 115. In this way the only outlets that need be provided from the screen cavity volumes are outlets 157, which may be connected up to a suitable reservoir, suction source or the like. The tangs of forks 113 are connected up by suitable rods 118 to synchronously operated linear devices, such as the devices 114 illustrated in the FIGS. 4 and 5 embodiment, the reciprocation of the rods 118 up and down resulting in the reciprocation of all of the screen due to the interconnecting arms 155, 156. Of course for larger vessels a greater number of concentric annular screen bodies may be provided, connected up in the same manner as illustrated in FIGS. 6 and 7.

Under some circumstances synchronous movement of the portions of the screen bodies is not of great importance, therefore the various screens may be connected up to separate linear actuator so as to move independently of each other.

The apparatus heretofore described has a relatively low power consumption compared to prior art apparatus, obtains a greater effective screening area for a certain design length of the perforated screen walls and may be made virtually any size without significantly interfering with the flow of the suspension. The circular cross-section embodiments are particularly suitable for treating suspensions at super atmospheric pressure, and the liquid flow may be throttled in conventional manners so that a suitable pressure drop is obtained across screen bodies, although this pressure drop should not be allowed to be too high in order to minimize screen clogging.

While in the embodiments illustrated in the drawings the screen surfaces have been shown as extending parallel to the direction of flow, if desired the screen body may be made conical or wedge-shaped with increasing through-flow cross-section for the suspension in the direction of suspension movement. The screen surfaces can also take other configurations.

Apparatus according to the present invention having been described, an exemplary manner of utilization thereof will now be set forth, with particular attention to FIGS. 1 and 2.

The inlet 2 of the container 1 is connected up to a source of supply of a suspension, while the outlet 4 of the container 1 is connected up to bent pipe section 6, or the like, with shaft 18 extending through bushing 20. The outlet 21 is connected up to reservoir 24.

As suspension is forced through the container 1 in direction A, linear actuator 19 acts upon rod 18 to move screen 10 also in direction A, at approximately the same speed as the suspension. During this movement the cavity volume 14, 9 will increase due to the differences in cross-sectional areas of the bearing surface means 1', 8 and the respective cooperating slide bearings 13, 12. This will cause a suction in the volume 9, 14, facilitating withdrawal of liquid through the openings in the perforated screen body 11 into the cavity 9, 14.

Once the screen body 10 reaches the end of its travel in direction A, the actuator 19 quickly moves the rod 18 opposite the direction A, causing the screen body 10 to also move opposite the direction A. During this movement the cavity volume 9, 14 decreases rapidly, again due to the differing cross-sectional areas of the bearing surface means 1', 8, etc., causing the pressure in the screen cavity volume 14, 19 to build up and effect backflushing of the screen body 11. Once the screen body 10 reaches its end of travel in the second direction it is again moved in direction A at about the same speed as the suspension flow, the suspension flow being continuous all the time.

It will thus be seen that according to the present invention an improved dewatering apparatus, and component assemblies thereof, have been provided. If treatment liquid of any kind is simultaneously added in the suspension stream to obtain a liquid flow towards the screen means, the apparatus may serve as an effective liquid displacing unit as well.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent apparatus and assemblies.

What is claimed is:

1. Apparatus for continuously dewatering flowing suspensions comprising:
    a generally cylindrical container having a continuously open inlet at one end thereof through which suspension to be dewatered continuously flows on a first direction, and a continuously open outlet at the other end thereof, said container having an axis extending generally parallel to or concentric with said first direction;
    screen means distinct from and unassociated with said inlet and outlet for removal of a portion of liquid from the suspension flowing through said container, and extending generally along the axis of said container in which it is disposed, said screen means comprising a first end and a second end opposite said first end and spaced generally along said axis from said first end;
    first and second support members mounted interiorly of said container and parallel to, or concentric with, said first direction, said first and second support members having different effective cross-sectional areas and being continuous and unapertured along the entire length thereof;
    first and second sealing bearing means, and first and second bearing surface means cooperating with said first and second sealing bearing means; one of said bearing means and said bearing surface means being mounted on said screen means at said first and second ends thereof, and the other of said bearing means and said bearing surface means being mounted on said first and second support members, and being continuous over the entire effective length of said support members;
    said screen means, between said first and second ends thereof, and said support members defining a screen cavity volume;
    an outlet extending from said screen cavity volume to an area remote from said containers; and
    mechanical means for moving said screen means in said first direction with respect to said support members, and in a second direction opposite said first direction, with said sealing bearing means and said bearing surface means cooperating, so that the cavity volume changes during movement of said screen means, so that said cavity volume increases during movement of said screen means in said first direction.

2. Apparatus as recited in claim 1 wherein said container is substantially circular in cross-section, and said bearing surface means are annular.

3. Apparatus as recited in claim 1 wherein said container in quadrate in cross-section and said bearing surface means are planar.

4. Apparatus as recited in claim 1 wherein said mechanical means comprise a rod extending axially in said container, and a linear actuator for effecting linear reciprocatory movement of said rod.

5. Apparatus as recited in claim 4 wherein said linear actuator comprises means for moving said screen means in said first direction at a first speed, and means for moving said screen means in said second direction at a second speed greater than said first speed.

6. Apparatus as recited in claim 4 wherein said mechanical means further comprises a spider connection connecting said rod to said screen means.

7. Apparatus as recited in claim 1 wherein said screen means comprises a plurality of screen bodies including a first body comprising first and second planar screens interconnected for common movement by at least one connector, and a second body comprising third and fourth planar screens interconnected for common movement by at least one connector.

8. Apparatus as recited in claim 7 wherein said first and second support members assocaited with said first body comprise an interior surface of a wall of said container and a parallel surface of an interior divider in said container, and a planar shelf spaced from and substantially parallel to said wall interior surface and a parallel surface of said interior divider, respectively.

9. Apparatus as recited in claim 8 wherein said mechanical means comprises a rod connected by a fork to both said screen bodies, and to a single linear actuator.

10. Apparatus as recited in claim 8 wherein said outlet penetrates said wall interior surface, and wherein said at least one connector is a tubular conduit interconnecting said first and second screens and having a larger interior cross-sectional area at the interconnection thereof to said second screen than at the interconnection thereof to said first screen.

11. Apparatus as recited in claim 1 wherein said container is substantially circular in cross-section, and wherein said screen means comprises a plurality of concentric annular screen bodies, said bodies collectively having screen surfaces facing each other and distributed over the cross-section of said container.

12. Apparatus as recited in claim 1 wherein said first support member includes an interior surface of said container extending substantially parallel to said first direction.

13. Apparatus as recited in claim 12 wherein said second support member includes a tubular sleeve concentric with said container interior surface.

14. Apparatus as recited in claim 12 wherein said first support member includes a first cylindrical interior member substantially concentric with said container, and said second support member includes a second cylindrical interior member substantially concentric with said container and spaced from said first member along said first direction.

15. Apparatus as recited in claim 14 wherein said first cylindrical interior member is hollow, and wherein said outlet extends from said first cylindrical interior member through a wall of said container.

16. Apparatus as recited in claim 1 wherein said screen means comprises first and second distinct screen bodies, each defining a cavity volume; and wherein said first and second support members cooperating with said first screen body comprise the interior surface of said container and a tubular sleeve concentric with said container interior surface, respectively; and wherein first and second support members are provided associated with said second distinct screen body, said first and second support members comprising a pair of cylindrical interior members having different cross-sectional areas, spaced from each other in said first direction, and disposed concentrically with said tubular sleeve.

17. Apparatus as recited in claim 1 wherein said bearing means are mounted on said first end and second end of said screen means for movement with said screen means, and wherein said bearing surface means are mounted stationarily on said support members, for cooperation with said sealing bearing means.

* * * * *